Jan. 9, 1940.　　　F. S. MARTIN ET AL　　　2,186,727

TESTING APPARATUS

Filed July 13, 1938

Inventors:
Frank S. Martin & Myron T. Kelley,
By:
Parker, Carlson, Pitzner & Hubbard
Attorneys.

Patented Jan. 9, 1940

2,186,727

UNITED STATES PATENT OFFICE 2,186,727

TESTING APPARATUS

Frank S. Martin, Ames, Iowa, and Myron T. Kelley, St. Louis, Mo., assignors to Precision Scientific Company, Chicago, Ill., a corporation of Illinois Application July 13, 1938, Serial No. 218,956

2 Claims. (Cl. 175—183)

The invention relates to testing apparatus and has particular utility in apparatus for measuring the hydrogen ion concentration or "acidity" of materials such for example as solutions or other compositions used in various industrial processes. Devices of this latter type are commonly known in the art as "pH meters", the concentration of hydrogen ions of the materials being expressed in terms of an arbitrary scale designated as pH units. pH meters of the general type herein contemplated depend for their operation upon the fact that a definite relation exists between the hydrogen ion concentration in a material and the voltage produced between the electrodes in a cell in which the material in question is utilized as an electrolyte. The electrical voltage or potential is, however, of a very low order of magnitude so that its measurement has heretofore been, in many respects, a rather delicate operation.

The general object of the present invention is to provide an improved form of potential measuring apparatus particularly suitable for use in a pH meter, which is easy to manipulate, inexpensive in construction, and which preferably does not entail the use of any batteries or standard cells but may, on the other hand, be operated from an ordinary alternating current lighting or power circuit.

Another object of the invention is to provide in an apparatus of the character described, in which, for example, the pH value of a material sample is determined by balancing the potential produced in a cell using the sample as an electrolyte against a known variable potential, an arrangement of parts which obviates the necessity of utilizing a galvanometer or any other power actuated moving parts, thereby simplifying the apparatus and making it rugged as well as easy to handle. This object is preferably accomplished, at least in part, by utilizing a cathode ray tube for indicating the point of balance between the potentials.

The invention also resides in various circuit improvements of the device by means of which inaccuracies in operation are avoided that might otherwise result from the presence of the alternating current supplied to the apparatus.

Figure 1:
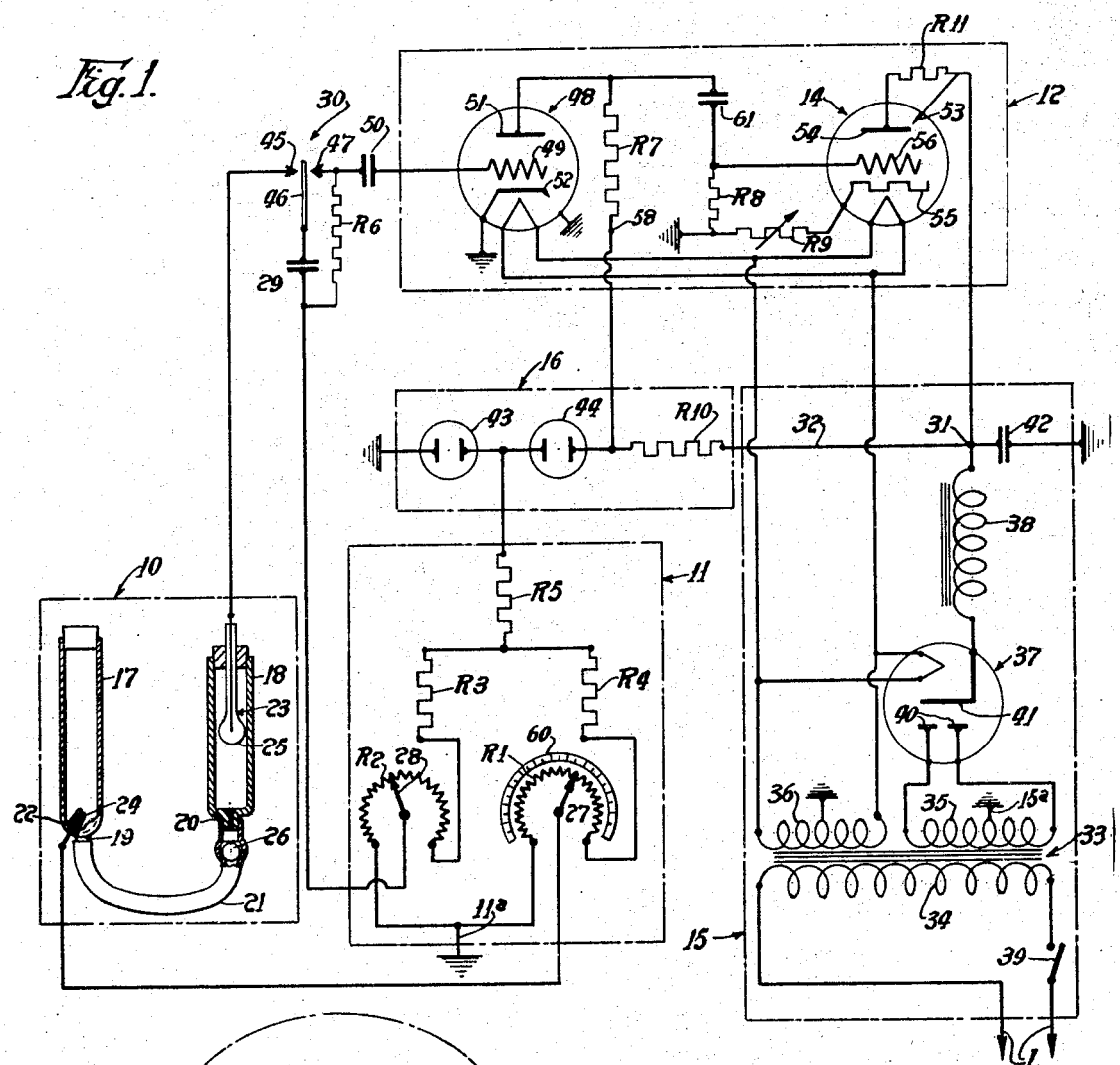
Figure 2:
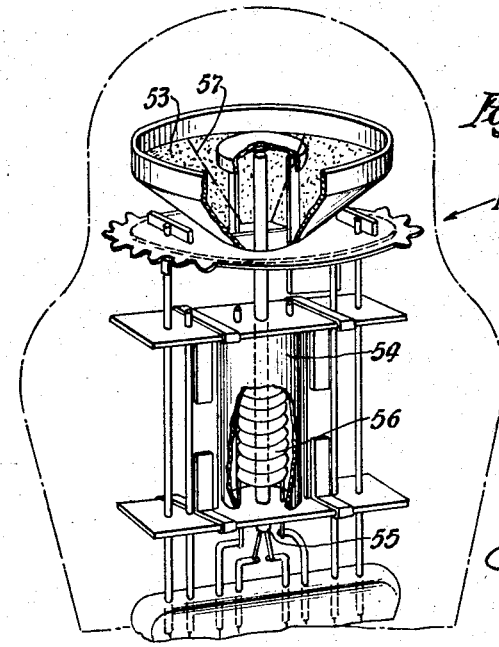

Further objects and advantages of the invention will become apparent as the following description proceeds taken in conjunction with the accompanying drawing in which:

Fig. 1 is a schematic wiring diagram of a testing apparatus embodying the invention, and Fig. 2 is a fragmentary perspective view partly in section of a cathode ray tube included in the apparatus of Fig. 1.

The invention has been shown and described herein, for purposes of illustration of its various novel features, as embodied in a pH meter utilized for testing the hydrogen ion concentration of various materials. It will be apparent to those skilled in the art, however, that various aspects of the invention are applicable to other forms of apparaus. The apparatus illustrated embodies in general a test-sample cell 10, a potential-balancing device 11 for supplying a known potential variable at will, and a potential-balance indicating device 12 embodying a cathode ray tube 14. Electrical energy is supplied to the apparatus from a rectifier 15 through a voltage regulating device 16. Roughly the procedure followed is to place a sample of the material to be tested in a cup 18 of the cell 10 and then adjust the voltage supplied by the potential-balancing device 11 until it just equalizes the potential appearing between the electrodes of the cell 10. The pH value of the solution can then be readily determined from the value of the known potential supplied by the potential-balancing device 11. In this procedure the point of balance of the potentials is indicated by the cathode ray tube 14.

The test-sample cell 10 may be of any suitable construction and the particular apparatus shown forms no part of the present invention. This illustrative test cell embodies in general a reference cup 17 and a sample cup 18 having apertures 19 and 20 at the lower ends thereof connected by a flexible rubber tube 21. The reference cup 17 and tube 21 are filled with a suitable solution such as potassium chloride while the sample cup 18 is filled with a sample of the material of which the hydrogen ion concentration is to be tested. The aperture 20 is of very small cross section so that a so-called "liquid junction" is formed at that point between the potassium chloride and the test-sample material. One electrode 22 for the cell is located at the bottom of the reference cup 17 while the other electrode 23 is located at the upper portion of the sample cup 18. Each of these electrodes may be formed of a platinum wire coated with silver and a final coating of silver chloride. The electrode 22 is positioned within a glass nipple 24 in the bottom of the reference cup 17 which communicates through an opening in the upper end with the interior of the reference cup. The wire of the electrode 23 is, on the other hand, completely enclosed in a glass bulb 25 filled with hydrochloric acid. This bulb 25 is made of comparatively low resistance glass, the over-all resistance of the bulb being about 15 to 50 megohms. A glass bead 26 in the tube 21 limits the flow of liquid through the tube while, at the same time, permitting a continuous film of liquid on its surface to connect the liquid above and below it in the tube and between the electrodes in the cell. When using a glass electrode of the type described, it is necessary to correct for the slight asymmetry potential which is present in all such glass electrodes. The associated apparatus is arranged to accomplish this correction as is hereinafter described.

The potential-balancing device 11 has been illustrated in the form of a potentiometer for supplying an electrical potential or voltage which is variable at will in order to oppose or balance the potential appearing between the electrodes 22—23 of the cell 10. The particular potentiometer illustrated includes two parallel-connected resistor legs made up respectively of potentiometer type variable resistors $R_1$ and $R_2$ as well as fixed resistors $R_3$ and $R_4$. These two parallel-connected resistor legs are connected in series with a fixed resistor $R_5$. The adjustable contacts 27 and 28 of the variable resistors $R_1$ and $R_2$ are connected, respectively, to the cell electrode 22, and to the cell electrode 23 through a condenser 29 and a manually operable snap acting switch 30. Voltage is supplied to the potentiometer 11 from the rectifier 15, one terminal of the potentiometer being connected to output terminal 31 of the rectifier through a conductor 32 and the voltage regulating device 16, while the other terminal of the potentiometer is connected to the second terminal of the rectifier through ground as indicated at 11ª and 15ª.

All of the electrical energy for the apparatus is supplied from the rectifier 15, which has been illustrated as a conventional full wave type rectifier. It embodies, in general, a transformer 33, having a primary winding 34 and secondary windings 35—36, as well as a full wave rectifier tube 37 and a filter choke 38. Current is supplied to the transformer primary winding 34 from alternating current supply lines L under the control of a manually operable switch 39. The secondary winding 36 has a center tap connected to ground and is utilized to supply low voltage alternating current to the cathode heaters of various vacuum tubes used in the apparatus, including the rectifier tube 37. Similarly, the secondary winding 35 has a grounded center tap at 15ª and is connected to the anode elements 40 of the rectifier tube 37. The indirectly heated cathode 41 of this rectifier is connected to the output terminal 31 through the filter choke 38. An electrolytic filter condenser 42 is also connected between the rectifier output terminal 31 and ground.

Accuracy of operation of the apparatus depends, in a large part, upon the constancy of the voltage applied to the potentiometer 11. This is especially true in view of the fact that the potentiometer is used to supply potentials of very low magnitude for balancing the potential developed in the cell 10. Accordingly, the voltage regulating device 16 is utilized for controlling the voltage applied to the potentiometer from the rectifier since the rectifier output voltage will frequently vary considerably with changes in the input voltage commonly encountered in an ordinary commercial power line. This voltage regulator 16 includes two glow tubes 43—44 connected in series with a stabilizing resistance $R_{10}$. These glow tubes are filled with an inert gas such as neon. The glow tube 43 is connected in parallel with the potentiometer 11 so that the voltage drop through the tube governs the voltage applied to the potentiometer. It has been found that the voltage drop across such a neon glow tube is independent of the voltage applied by the rectifier to the device 16 over rather a wide range so that an essentially constant voltage is applied to the potentiometer. The second neon glow tube 44 coacts with the tube 43 for stabilizing the potential in the cathode ray tube grid control circuit as is hereinafter described.

The resistance of the cell 10 is so high that it is, in general, impractical to attempt the actuation of a measuring instrument directly by the current flowing through the cell. Accordingly, the small condenser 29 is charged by momentarily closing the switch contacts 45—46 so as to apply to it the differential between the potential supplied by the cell 10 and the balancing potential derived from the potentiometer 11. By then closing the switch contacts 46—47, the charge accumulated on the condenser 29 can be utilized to actuate a suitable indicator. When the indicator shows that the balanced potentials are equal, or in other words, that there is no charge on the condenser 29, then the known potentiometer potential exactly equals the cell potential and the pH value of the sample material in the cell can be readily determined from the known value of the balancing potential. Since the charge accumulated on the condenser 29 with such an arrangement is rather small, it is preferably amplified before being used to control an indicating device as, for example, by a triode vacuum tube amplifier 48. More amplifier tubes may be used, of course, if desired.

In accordance with one aspect of the present invention, a cathode ray tube, such as the tube 14 herein illustrated, is arranged to serve as an indicating device in the apparatus. By using such a tube-type indicator, it is unnecessary to include any power actuated moving parts in the system, such as a galvanometer. As a consequence the ruggedness and simplicity of the apparatus are increased without sacrifice in sensitivity and precision of operation.

In the illustrative circuit shown, the amplifier tube 48 includes a control grid 49 as well as anode and cathode elements 51 and 52, respectively, which are connected across a load resistor $R_7$. The cathode 52 is of the indirectly heated type, being supplied with heating current from the transformer 36. Since the output current of the triode rectifier is controlled by the biasing voltage applied to its grid, the charge on the condenser 29 can be used to change the grid biasing voltage and hence the output current of the amplifier tube 48. For this purpose the condenser 29 is connected to the grid 49 of the amplifier tube by manual closure of the switch contacts 46—47 so that the charge on the condenser 29 is transferred to a blocking condenser 50 and thence to the grid 49. The changes in output current of the amplifier tube 48 cause a commensurate change in potential drop through the associated load resistor $R_7$ and accordingly, this controlled load resistor voltage may be used to vary the biasing the voltage applied to the control grid of the cathode ray tube 14. In order to insure accuracy of operation, however, it is essential that terminal 58 of the load resistor be maintained at a definitely constant voltage and accordingly this terminal is connected to the cathode tube through the neon glow tubes 43—44 and ground. As was previously noted, the voltage drop through the neon glow tubes is substantially independent of variations in output for the rectifier 15 so that a constant voltage is maintained at terminal 58 of the amplifier load resistor $R_7$.

The cathode ray tube 14 (Fig. 2) is of conventional construction and embodies a fluorescent target screen 53, an anode 54, cathode 55 and control grid 56. The cathode is heated by current supplied from the transformer secondary winding 36. In general, a segmental-shaped image or shadow 57 is formed on the screen 53 (Fig. 2), the width of this shadow being governed by the biasing voltage applied to the control grid 56. A resistor $R_8$ connected between the grid 56 and cathode 55 prevents the strongest biasing voltage likely to be encountered from exceeding the cut-off bias of the tube. The circuits are arranged so that when no voltage is applied to the grid 49 of the amplifier tube 48, the biasing voltage on the cathode ray tube grid 56 will be that required to produce an image of some preselected intermediate width. The grid 56 is coupled to the output of the amplifier tube 48 through condenser 61 so that the potential in the grid 56 is varied from its normal or median value by changes in voltage drop across the resistor $R_7$, and hence in response to changes in the charge on condenser 29. When the grid 56 is made more positive, the image angle becomes greater and conversely, when it is made more negative the image angle becomes smaller. A variable resistor $R_9$ is connected between the cathode 55 and ground so as to regulate the load on the tube. The usual resistor $R_{11}$ is connected between the anode and target elements 54 and 53 of the cathode ray tube so that an accelerating potential will be applied to the electrons advancing toward the target.

As was previously noted, the potential developed between the electrodes of the cell 10 depends upon the hydrogen ion concentration of the material sample which is used to fill the cup 18. In general, there is, at 25° C., a change in potential produced by the cell of 0.0591 volt per unit change in pH value of the sample which forms its electrolyte. On the other hand, the value of the balancing voltage derived from the device 11 depends upon the setting of the potentiometer legs $R_1$ and $R_2$. Accordingly, a change in the setting of the potentiometer leg $R_1$ to effect a change of 0.0591 volt in the output voltage of the device would exactly balance a change of 1 pH in the hydrogen ion concentration in the material in the cell 10. To facilitate the manipulation of the apparatus, a calibrated scale 60 is provided for the potentiometer leg $R_1$, this scale being preferably calibrated in terms of pH units. Thus, each full increment on the scale 60 corresponds to a step in resistance which effects a voltage change of 0.0591 volt. It will be apparent that a predetermined incremental change in the setting of the potentiometer leg $R_1$ can only effect a corresponding predetermined incremental change in output voltage of the potentiometer when a constant input voltage is applied to the potentiometer. Hence, the use of the scale 60 conveniently calibrated in terms of pH units makes a constant input voltage for the potentiometer 11 a prerequisite. As was previously noted, the neon glow tube 43 connected in parallel across the potentiometer device 11 effectively serves to maintain the voltage across the device at a constant value irrespective of the almost inevitable changes in the alternating current voltage supplied to the apparatus from the ordinary power lines L.

The purpose of including the potentiometer leg $R_2$ in parallel with the potentiometer leg $R_1$ is to facilitate a compensation or correction for the asymmetry potential which always occurs in cells having glass electrodes. By varying the setting of the potentiometer leg $R_2$, the output voltage of the device 11 can be corrected for this purpose without changing the setting of the potentiometer leg $R_1$ which is associated with the calibrated indicator scale 60. The procedure to accomplish this correction is to first fill the sample cup 18 with a standard sample of the type of material to be tested, the hydrogen ion concentration of the standard being of some known value as, for example, 4 pH. The potentiometer leg $R_1$ is set for a value corresponding to the value of 4 pH and the potentiometer leg $R_2$ is then varied until the output voltage of the device 11 exactly balances the cell potential. In determining this point of balance between the potentiometer device 11 and cell potentials, the potentiometer leg $R_2$ is first set at some random value. The switch contacts 45—46 are then closed to charge the condenser 29 by the difference in potentials produced between device 11 and cell 10. After the condenser 29 has been thus charged, the switch 30 is manually shifted so as to close contacts 46—47 and thereby vary the biasing voltage on the amplifier tube control grid 49 in accordance with the value of the charge on the condenser 29. The grid will be made either more negative or more positive depending upon the polarity of the charge, or in other words, upon whether the cell potential exceeds or is less than the potentiometer potential. The output current of the amplifier tube 48 is thus changed in response to the change in the grid bias of the amplifier, thereby in turn varying the biasing potential applied to the cathode ray tube control grid 56, with a resultant change in the angular spread of the shadow or image on the screen 53. This process of first charging the condenser 29 and then applying the charge to the amplifier control grid is repeated, with changes in the setting of the potentiometer legs $R_2$ between each operation, until the potential supplied by the potentiometer 11 exactly balances the potential at the cell 10. When this point of balance is reached, no charge is applied to the condenser 29 and accordingly no change appears in the angular spread of the image on the screen 53 when the switch contacts 46—47 are closed. The potentiometer leg $R_2$ is subsequently left at this adjusted position so that an exact compensation is made for the asymmetry potential of the glass electrode in the cell.

After the apparatus has been initially adjusted through the use of a standard sample of the general type of material to be tested, it may be subsequently used for testing the pH value of other samples of material of the same type. In this latter operation the sample cup 18 is filled with the sample of unknown pH value and the potentiometer leg $R_1$ is varied until the cathode ray tube indicates a point of balance between the cell and potentiometer potentials. The pH value of the solution sample can then be read directly from the calibrated scale 60. The same general potential balancing operations are repeated during the course of this operation as in the initial adjustment of the apparatus except that, as was noted, the potentiometer leg $R_1$ is changed in its setting rather than the potentiometer leg $R_2$, the latter being left in its previously determined correction position. Thus, the potentiometer leg $R_1$ is first set for what is thought to be approximately the pH value of the test sample and the switch contacts 45—46 are closed to charge the condenser 29 by the application to it of the differential between the potentials of the cell and potentiometer. The switch contacts 46—47 are then closed to apply the charge on the condenser 29 to the control grid 49 and the resultant change in output current of the amplifier tube causes a change in the biasing voltage on the control grid of the cathode ray tube 14 so that the angularity of the image on the cathode ray tube is either increased or decreased. If the potentiometer $R_1$ has been set at too low a value, the angularity of the cathode ray tube image will be changed in one sense, say decreased, and, similarly, if the potentiometer $R_1$ has been set at too high a value, the angularity of the image will be changed in the opposite sense, that is, increased. The setting of the potentiometer $R_1$ may thus be quickly changed to a value at which the output potential of the device 11 exactly balances the cell potential and at which point no change in the angularity in the cathode ray tube image will occur. When the point of potential balance is thus achieved, the pH value of the sample is read directly from the scale 60 in accordance with the setting of the potentiometer $R_1$.

In view of the proximity of the alternating current cathode heater leads there is some danger of the inadvertent accumulation of a charge on the blocking condenser 50. To avoid inaccuracies in operation due to this cause, a leakage resistor $R_6$ is connected across the switch 30 and the condenser 29. Accordingly, any charge which would tend to accumulate on the condenser 50 is leaked off through the resistor $R_6$.

From the foregoing it will be seen that a rugged device has been provided which requires no power actuated moving parts. Moreover, it may be operated from an ordinary power circuit without loss of accuracy and no standard cells or battery devices are required in recalibrating the apparatus for samples of various types of material.

Although a particular embodiment of the invention has been shown and described in some detail for illustration of its various novel features, there is no intention to limit the invention to such embodiment but, on the other hand, the appended claims are intended to cover all modifications and alternative constructions within the spirit and scope of the invention.

We claim as our invention:

1. In an instrument for testing the value of an unknown potential the combination of, a source of potential, a potentiometer for varying at will the potential supplied from said source, a condenser, means for applying to said condenser a charge proportional to the difference between the potential to be measured and the potential supplied from said potentiometer, a cathode ray tube embodying a control grid and an image screen on which an image is produced which varies in accordance with changes in a biasing voltage applied to said grid, means for applying a biasing voltage to said grid, means for varying the biasing voltage applied to said grid in proportion to the charge on said condenser whereby the image on said screen indicates the point of balance between said potentials, and means including a calibrated scale associated with said potentiometer for indicating the changes required in the potential supplied thereby to attain a zero value of said differential.

2. In an instrument for testing the value of an unknown potential, the combination of source of potential of known value variable at will, means for connecting said source of known potential in voltage opposition to the potential of unknown value, a condenser, means for applying the differential between said potentials to said condenser to charge the same, a potential balance detection device including a triode vacuum tube provided with a control grid, a second condenser in series with said grid, means indicating a switch interposed between said condensers for connecting the same in series to transfer any charge from said one condenser through said second condenser to said grid, and means including a leakage resistor connected in parallel with said switch and said one condenser for dissipating any charge inadvertently applied to said second condenser prior to the closure of said switch.

FRANK S. MARTIN.
MYRON T. KELLEY.

CERTIFICATE OF CORRECTION.

Patent No. 2,186,727.  January 9, 1940.

FRANK S. MARTIN, ET AL.

It is hereby certified that error appears in the printed specification of the above numbered patent requiring correction as follows: Page 4, second column, line 38, claim 2, for the word "indicating" read including; and that the said Letters Patent should be read with this correction therein that the same may conform to the record of the case in the Patent Office.

Signed and sealed this 5th day of March, A. D. 1940.

(Seal)

Henry Van Arsdale,
Acting Commissioner of Patents.